July 1, 1941.     M. G. CROSBY     2,247,941
VARIABLE PHASE SHIFTER
Filed Jan. 24, 1939
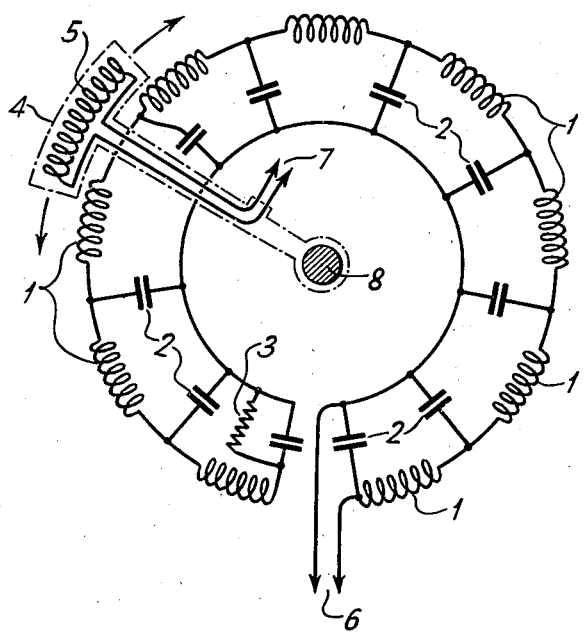
INVENTOR.
MURRAY G. CROSBY
BY
ATTORNEY.

Patented July 1, 1941

2,247,941

UNITED STATES PATENT OFFICE 2,247,941

VARIABLE PHASE SHIFTER

Murray G. Crosby, Riverhead, N. Y., assignor to Radio Corporation of America, a corporation of Delaware Application January 24, 1939, Serial No. 252,527

3 Claims. (Cl. 171—238)

This disclosure concerns a phase shifter of the artificial line type having its phase shifter elements arranged in a circle with the output coupling coil mounted on a rotating arm on a shaft. Hence a simple mechanical means of coupling to the phase shifting line or network at any point is made available.

In the prior art of phase shifters the length of the phase-shifting network or artificial line is either varied by means of tap switches or sliders, or a coupling coil is provided which rides on a track and is coupled to different points of the line by means of a belt control or mechanical linkages. All of these methods are bulky and complicated and it is the purpose of this invention to provide a compact phase shifter with a simplified coupling means.

In describing my invention in detail reference will be made to the attached drawing wherein the single figure illustrates an embodiment of my phase shifter.

In the arrangement shown the artificial line, consisting of inductance elements 1 and capacitive elements 2, is mounted so that the coils are disposed substantially along a closed path or circle. The coupling coil 5 is mounted on an arm for movement relative to the line 1, 2 so that it may be coupled to any one of the coils 2 of the line by rotating shaft 8 by means of dial 9. The output leads 7 to the couping coil 5 may be run out the hollow shaft 8 as shown or may utilize slip rings to allow continuous rotation of the shaft 8. The input voltage is supplied to the phase shifting line by leads 6 and the phase shifted energy is taken from leads 7. Resistor 3 damps the line to prevent reflection therealong. This damping means may be replaced by a combination of a resistor and inductance or capacity to effect a more complete damping.

It will be noted that in order to make the phase shift of the line continuous for all positions of the rotatable coupling coil, it will be necessary to make the artificial line, consisting of elements 1, 2, of an electrical length of 360 degrees. With this length, the coupling coil may be rotated continuously and the change of phase will be proportional to the angle of rotation. If a smaller amount of phase shift is required, for instance 90 degrees, the line may have a length of 90 degrees and stops may be arranged to stop rotation of the coupling coil at the beginning and end of the line. These stops will prevent the large change of phase shift which would occur as the coupling coil is rotated past the end, to the beginning, of the line.

It will be apparent that a closed circle is not a necessity for the disposition of the line elements. A semi-circle or any other segment might be used while still obtaining the advantage of the rotation of a dial to obtain the phase shift.

In order to prevent a reduction of the phase shifter output when the coupling coil passes between two of the line coils 1, the coupling coil 5 is made to cover more than one coil area. In an alternative modification I use two coupling coils 5 in series or parallel, one of which would be over a line coil 1, at the time when the other was between two of the coils 1.

In the modification illustrated, series inductances and parallel capacities are used. Series capacities and parallel inductances could also be used if desired. In this respect any type of filter section or retard circuit could be employed.

What is claimed is:

1. In phase shifting apparatus, a plurality of coils each having its axis falling along an arcuate path, means connecting said coils in series, a plurality of condensers connected between spaced points on said series connection and a common point to form a phase shifting circuit, means for impressing current on said circuit whereby waves of the frequency of said current are set up in said circuit, a pick-up coil mounted for movement along said arcuate path in coupled relation to at least one of said plurality of coils whereby alternating voltages of a phase depending on the position of said pick-up coil with respect to said phase shifting circuit is set up in said pick-up coil, and means for utilizing said alternating voltage set up in said pick-up coil.

2. In phase shifting apparatus, a plurality of inductance coils each having its axis along an arcuate path, means connecting said coils in series, a plurality of condensers connected between spaced points on said series connection and a common point to form a phase shifting circuit, means for impressing current on said circuit whereby waves of the frequency of said current are set up in said circuit, a pick-up inductance coil mounted for movement along said arcuate path in coupled relation to two of said plurality of coils whereby alternating voltages of a phase depending on the position of said pick-up coil with respect to said phase shifting circuit and of an amplitude which is substantially constant in all positions of said pick-up coil is set up in said pick-up coil, and means for utilizing said alternating voltage set up in said pick-up coil.

3. In phase shifting apparatus, a plurality of inductance coils each having its axis falling along an arcuate path, means connecting said coils in series, a plurality of condensers connected between spaced points on said series connection and a common point to form a phase shifting circuit, means connected with one end of said series connection and with said common point for impressing alternating current on said circuit whereby waves of the frequency of said current are set up in said circuit, a damping resistance connected with the other terminal of said series connection and said common point for preventing reflection of waves in said circuit, a pick-up coil mounted for movement along said arcuate path in coupled relation to at least one of said plurality of coils whereby alternating voltages of a phase depending on the position of said pick-up coil with respect to said phase shifting circuit is set up in said pick-up coil, and means for utilizing said alternating voltage set up in said pickup coil.

MURRAY G. CROSBY.